United States Patent
Ookubo et al.

(10) Patent No.: US 6,715,345 B2
(45) Date of Patent: Apr. 6, 2004

(54) COAXIAL PROBE WITH CANTILEVER AND SCANNING MICRO-WAVE MICROSCOPE INCLUDING THE SAME

(75) Inventors: Norio Ookubo, Tokyo (JP); Noriyuki Kodama, Tokyo (JP); Hiroaki Kikuchi, Tokyo (JP); Yuichi Naitou, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 09/839,106

(22) Filed: Apr. 20, 2001

(65) Prior Publication Data

US 2003/0034453 A1 Feb. 20, 2003

(30) Foreign Application Priority Data

Apr. 20, 2000 (JP) .......... 2000-119516

(51) Int. Cl.[7] .......... G01B 7/34; G01N 13/10; G01N 22/00
(52) U.S. Cl. .......... 73/105; 73/866.5; 324/644
(58) Field of Search .......... 73/105, 866.5; 250/306; 324/642, 644, 637, 639

(56) References Cited

U.S. PATENT DOCUMENTS

| | | | | |
|---|---|---|---|---|
| 4,894,612 A | * | 1/1990 | Drake et al. | 324/754 |
| 5,900,618 A | | 5/1999 | Anlage et al. | 250/306 |
| 5,936,237 A | * | 8/1999 | van der Weide | 73/105 X |
| 6,118,282 A | * | 9/2000 | Grieger | 73/866.5 X |
| 6,386,055 B1 | * | 5/2002 | Eason | 73/866.5 |
| 2002/0155625 A1 | * | 10/2002 | Chapman et al. | 436/536 |

FOREIGN PATENT DOCUMENTS

| | | | | |
|---|---|---|---|---|
| EP | 971227 | * | 1/2000 | G01N/22/04 |
| JP | 55-83855 | * | 6/1980 | G01R/1/06 |
| JP | 5-164514 | | 6/1993 | G01B/7/34 |
| JP | 8-248322 | | 9/1996 | G01B/11/00 |
| JP | 9-178760 | | 7/1997 | G01B/21/30 |
| WO | WO 99/16102 | | 4/1999 | G01B/7/34 |

OTHER PUBLICATIONS

C. P. Vlahacos, et al., "Quantitative Topographic Imaging Using a Near–Field Scanning Microwave Microscope", Applied Physics Letters, vol. 72, No. 14, p. 1778 only provided Apr. 1998.

G. E. Ponchak, et al., "Evanescent Microwave Probes Using Coplanar Waveguide and Stripline for Super–Resolution Imaging of Materials", IEEE, vol. 4, 199, p. 1859 only provided 1999 month not given.

* cited by examiner

*Primary Examiner*—Thomas P. Noland
(74) *Attorney, Agent, or Firm*—Scully, Scott, Murphy & Presser

(57) ABSTRACT

A coaxial probe includes a coaxial cable including an electrical conductor extending therethrough and projecting therefrom at an end thereof, a planar waveguide on which the electrical conductor projecting from the coaxial cable is mounted, and a sensor electrically connected to the electrical conductor through the planar waveguide. The planar waveguide may be comprised of a substrate, and a strip line formed on the substrate, the strip line being electrically connected at one end to the sensor and at the other end to the electrical conductor. The sensor may be comprised of a cantilever supported at a distal end thereof on the planar waveguide, and a probe mounted on a free end of the cantilever.

25 Claims, 4 Drawing Sheets

COAXIAL PROBE WITH CANTILEVER AND SCANNING MICRO-WAVE MICROSCOPE INCLUDING THE SAME

BACKGROUND OF THE INVENTION

1. Field of the Invention

The invention relates to a coaxial probe scanning a surface of an object with a probe to thereby monitor a physical quantity such as a shape of the surface or an electrical characteristic of the object. The invention further relates to a scanning micro-wave microscope including the above-mentioned coaxial probe for forming an image of a surface of an object.

2. Description of the Related Art

A scanning probe microscope has a resolution in atomic level, specifically, a resolution of an order of nanometer or smaller. In addition, a scanning probe microscope has a function of forming an image of a three-dimensional shape, based on information including a profile of height of an object. Hence, a scanning probe microscope is used in many fields.

It is assumed that a coaxial cable defining a coaxial resonator to be excited by micro-waves is formed at an end surface thereof with an opening. If the opening of the coaxial cable is made to approach a surface of an object, an impedance or electric coupling of the opening is varied, and accordingly, a resonance frequency of the coaxial resonator is shifted, and a Q-value of the coaxial resonator is also varied.

Accordingly, as a surface of an object is scanned with the opening of the coaxial cable, a resonance frequency or Q-value of the coaxial cable is varied. As a result, it would be possible to form an image of a surface of an object, based on variation of the resonance frequency or Q-value.

A scanning micro-wave microscope operates under the above-mentioned principle. For instance, an example of a scanning micro-wave microscope is suggested in Applied Physics Letters, Vol. 72, pp. 1778–1780,1989.

In operation of the suggested scanning micro-wave microscope, an opening of a coaxial cable is positioned slightly above a surface of an electrically conductive object, the surface is scanned with the opening of the coaxial cable, it is detected what degree a frequency is shifted in dependence on a distance between the opening of the coaxial cable and the surface of the object, and an image of the surface of the object is formed based on the detected degree.

A scanning micro-wave microscope has an image resolution of $1/1000$ of a wavelength of a micro-wave or smaller, which means that the scanning micro-wave microscope constitutes a so-called proximity field microscope.

In particular, a point at which a resonance frequency is shifted and/or a Q-value is varied, detected by a scanning micro-wave microscope, corresponds to a point at which conservation energy and/or dissipation energy of a system defined by an object and a coaxial resonator are(is) varied.

A scanning micro-wave microscope is required to have a resolution which is generally equal to ½ to ¼ of a diameter detected by a tip end of an electrical conductor extending through a coaxial cable. In order for a scanning micro-wave microscope to have such a resolution, it would be necessary for the electrical conductor to approach a surface of an object at a distance of a diameter of the tip end of the electrical conductor or smaller.

However, in the above-mentioned conventional scanning micro-wave microscope, since the electrical conductor of the coaxial cable is made directly to approach a surface of an object, a closest distance between the electrical conductor and a surface of an object could be just few micrometers. If the electrical conductor is positioned relative to a surface of an object at a distance smaller than the above-mentioned closest distance, just a few micrometers, the electrical conductor might collide with a surface of an object or make uncontrollable contact with a surface of an object. This means that a scanning micro-wave microscope or a proximity field microscope cannot accomplish its best performance, because it works better when it is located at a smaller distance from a surface of an object.

Japanese Unexamined Patent Publication No. 8-248322 has suggested an attachment module for measuring a focus of an objective lens, including a plate, a support mounted on the plate, a positioning device for positioning an object relative to the support in two directions perpendicular to each other, and a probe having a tip end, composed of glass fibers and mounted on the positioning device.

Japanese Unexamined Patent Publication No. 9-178760 has suggested a scanning probe microscope including a cantilever, a probe mounted on a tip end of the cantilever, a detector for detecting a physical quantity appearing between the probe and the object, a mover for three-dimensionally moving the probe and the object, a controller for controlling an operation of the mover, and means for moving the scanning probe microscope.

However, the above-mentioned problems remain unsolved even in the scanning probe microscopes suggested in the above-mentioned Publications.

SUMMARY OF THE INVENTION

In view of the above-mentioned problems in the conventional scanning probe microscope, it is an object of the present invention to provide a coaxial probe which is capable of making a probe approach a surface of an object at a distance of a diameter of an electrical conductor extending through a coaxial cable or smaller to thereby measure an impedance along a surface of an object.

It is also an object of the present invention to provide a scanning probe microscope including such a coaxial probe.

In one aspect of the present invention, there is provided a coaxial probe including (a) a coaxial cable including an electrical conductor extending therethrough and projecting therefrom at an end thereof, (b) a planar waveguide on which the electrical conductor projecting from the coaxial cable is mounted, and (c) a sensor electrically connected to the electrical conductor through the planar waveguide.

For instance, the planar waveguide may be comprised of (b1) a substrate, and (b2) a strip line formed on the substrate, the strip line being electrically connected at one end to the sensor and at the other end to the electrical conductor.

For instance, the planar waveguide may be comprised of (b1) a substrate, and (b2) a coplanar line formed on the substrate, the coplanar line being electrically connected at one end to the sensor and at the other end to the electrical conductor.

For instance, the sensor may be comprised of (c1) a cantilever supported at a distal end thereof on the planar waveguide, and (c2) a probe mounted on a free end of the cantilever.

It is preferable that the coaxial probe further includes a support which fixes the cantilever at the distal end of the cantilever onto the planar waveguide.

It is preferable that the support and the cantilever are located on an extension of the electrical conductor and are inclined relative to an axis of the electrical conductor.

It is preferable that the sensor is excited at a frequency close to a resonance frequency of a movement of the cantilever.

It is preferable that the sensor is detachable from the coaxial cable or from the coaxial cable.

There is further provided a coaxial probe including (a) a coaxial cable including a first electrical conductor extending therethrough, (b) a first connector non-separatable from the coaxial cable, (c) a second connector detachably coupled to the first connector and including a second electrical conductor extending therethrough and projecting therefrom at an end thereof, the second electrical conductor being electrically connected to the first electrical conductor when the first and second connectors are coupled to each other, (d) a planar waveguide on which the second electrical conductor projecting from the second connector is mounted, and (e) a sensor electrically connected to the second electrical conductor through the planar waveguide.

There is still further provided a coaxial probe including (a) a coaxial cable including an electrical conductor extending therethrough and projecting therefrom at an end thereof, (b) a planar waveguide on which the electrical conductor projecting from the coaxial cable is mounted, (c) a sensor electrically connected to the electrical conductor through the planar waveguide, (d) an electrically insulating sensor holder making contact with the sensor, and (e) a device for compressing the sensor holder onto the sensor.

For instance, the device may be comprised of a screw. As an alternative, the device may be comprised of a lever supported for rotation, and an actuator which actuates the lever such that the lever compresses the sensor holder onto the sensor.

There is yet further provided a coaxial probe including (a) a coaxial cable including an electrical conductor extending therethrough and projecting therefrom at an end thereof, (b) a planar waveguide on which the electrical conductor projecting from the coaxial cable is mounted, (c) a sensor electrically connected to the electrical conductor through the planar waveguide, (d) a sensor holder making contact with the sensor, (e) a device for compressing the sensor holder onto the sensor, (f) a piezoelectric device incorporated in the sensor holder, and (g) an electrode terminal extending from the piezoelectric device outwardly of the coaxial cable.

There is still yet further provided a coaxial probe including a coaxial cable including an electrical conductor extending therethrough and projecting therefrom at an end thereof, the electrical conductor including a bending portion and a sharpened tip end, the bending portion defining a cantilever and the sharpened tip end defining a probe.

In another aspect of the present invention, there is provided a scanning micro-wave microscope including (a) one of the above-mentioned coaxial probes, and (b) a controller. The sensor includes a cantilever supported at a distal end thereof on the planar waveguide, and a probe mounted on a free end of the cantilever. The controller controls a distance between the probe and an object, based on a detection signal indicative of displacement of a free end of the cantilever, and scanning a surface of the object with the probe to thereby form an image of the surface of the object.

The advantages obtained by the aforementioned present invention will be described hereinbelow.

In accordance with the present invention, it would be possible to make the coaxial probe approach a surface of an object at a distance which is a general level in an interatomic-force microscope, and measure an electric capacity along irregularities of a surface of an object.

In addition, since it would be possible to exchange a sensor to be used in an interatomic-force microscope, into another one, a coaxial probe suitable for measurement could be selected.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
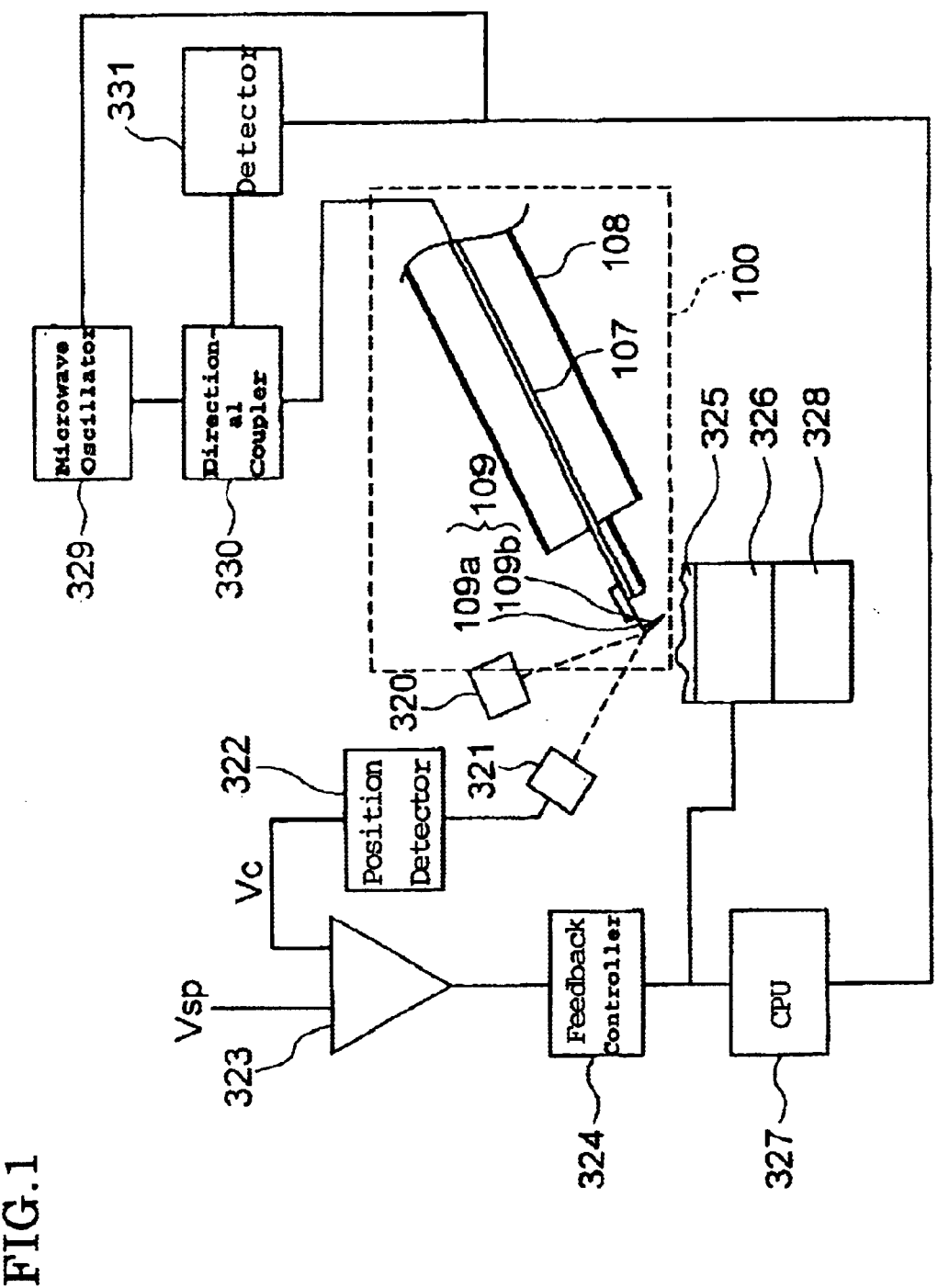
FIG. 1 is a block diagram of a scanning probe microscope in accordance with an embodiment of the present invention.

FIG. 1 is a block diagram of a scanning micro-wave microscope in accordance with a preferred embodiment of the present invention.

The scanning micro-wave microscope is comprised of a measurement unit which measures physical quantity of an object 325, based on micro-wave resonance, and a controller.

The measurement unit is comprised of a coaxial probe or coaxial resonator 100, a micro-wave oscillator 329, a directional coupler 330, and a detector 331.

The coaxial probe 100 includes a coaxial cable 108 including an electrical conductor 107 extending centrally therethrough and projecting therefrom at an end of the coaxial cable 108, and a sensor 109 electrically connected to the electrical conductor 107.

The sensor 109 is comprised of a cantilever 109a, and a probe 109b mounted on a free end of the cantilever 109a.

The controller is comprised of a laser beam source 320, a division photodiode 321, a position detector 322, an error amplifier 323, a feedback controller 324, a first actuator 326, a second actuator 328, and a central processing unit (CPU) 327.

The controller detects a signal indicative of a bending displacement of the cantilever 109a, controls a distance between the probe 109a and the object 325, based on the detected detection signal, and scans a surface of the object 325 with the probe 109b to thereby form an image of a surface of the object 325. Specifically, the controller detects a bending displacement of the cantilever 109a under a principle of optical lever by emitting a laser beam to a tip end of the cantilever 109a, and controls a relative distance between the object 325 and the probe 109b with a resolution in a sub-nanometer order. In addition, the controller scans the object 325 with the probe 109b to thereby measure topography and a resonance characteristic relating to electric coupling of the coaxial probe 100 with the object 325.

Hereinbelow is explained an operation of the scanning micro-wave microscope including the coaxial probe 100.

As illustrated in FIG. 1, the laser beam source 320 emits a laser beam to a tip end of the cantilever 109a. A laser beam reflected at the tip end of the cantilever 109a is received in the division photodiode 321, and the division photodiode 321 transmits a signal to the position detector 322 accordingly.

The position detector 322 transmits a signal Vc indicative of a displacement of a tip end of the cantilever 109a, to the error amplifier 323, based on the signal transmitted from the division photodiode 321.

The error amplifier 323 receives both the signal Vc and a signal Vsp indicative of a predetermined value. The error amplifier 323 amplifies a difference between the signals Vc and Vsp.

A signal indicative of the thus amplified difference is transmitted to the first actuator 326 through the feedback controller 324. Based on the signal, the first actuator 326 controls a relative distance between the probe 109b and the object 325.

While a relative distance between the probe 109b and the object 325 is controlled in the above-mentioned manner, the central processing unit 327 instructs the micro-wave oscillator 329 to transmit a micro-wave to the coaxial cable 108 through the directional coupler 330. The micro-wave causes electric resonance in a coaxial resonator defined by the coaxial cable 108.

The detector 331 detects an amplitude of the reflected laser beam transmitted from the coaxial cable 108 through the directional coupler 330. Based on the thus detected amplitude, the central processing unit 327 keeps a resonance frequency of the micro-wave oscillator 329 at a center of resonance. As a result, the coaxial probe 100 is kept resonated.

The central processing unit 327 transmits a signal to the second actuator 328 for scanning the object 325, and receives control signals transmitted to the first actuator 326, relating to irregularities of a surface of the object 325. In addition, the central processing unit 327 receives both a micro-wave frequency or a resonance frequency necessary for keeping the coaxial probe 100 resonated, and an output signal transmitted from the detector 331, indicative of an amplitude of the reflected micro-wave, and forms images of irregularities of a surface of the object 325, based on those frequency and signals.

Hereinbelow are explained embodiments of the coaxial probe 100 constituting a part of the scanning micro-wave microscope in accordance with the embodiment.

Figure 2A:
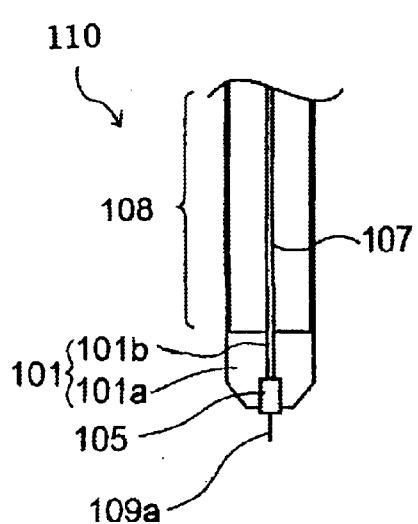
FIG. 2A is a cross-sectional view of a coaxial probe in accordance with the first embodiment.
Figure 2B:
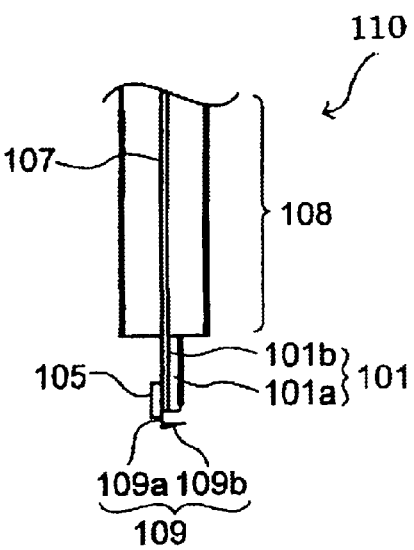
FIG. 2B is a side view of a coaxial probe in accordance with the first embodiment.

FIG. 2A is a cross-sectional view of the coaxial probe 110 in accordance with the first embodiment, and FIG. 2B is a side view of the coaxial probe 110.

The coaxial probe 110 is comprised of a coaxial cable 108 including an electrical conductor 107 extending therethrough and projecting therefrom at an end thereof, a planar waveguide 101 on which the electrical conductor 107 projecting from the coaxial cable 108 is mounted, and a sensor electrically connected to the electrical conductor 107 through the planar waveguide 101.

The planar waveguide 101 is comprised of a substrate 101a having a size of 4 mm×4 mm, and a strip line 101b formed on the substrate 101a.

The sensor 109 is comprised of a cantilever 109a supported at a distal end thereof on the planar waveguide 101, and a probe 109b mounted on a free end of the cantilever 109a.

The sensor 109 is excited at a frequency close to a resonance frequency of a movement of the cantilever 109a.

The probe 109b having a sharpened tip end is incorporated into the electrical conductor 107.

The strip line 101b is electrically connected at one end to the cantilever 109a through In alloy and at the other end to the electrical conductor 107.

A support 105 having a size of 1 mm×2 mm and a thickness of 0.5 mm fixes the cantilever 109a at the distal end of the cantilever 109a onto the planar waveguide 101.

The support 105 and the cantilever 109a are located on an extension of the electrical conductor 107 and are inclined relative to an axis of the electrical conductor 107. This arrangement ensures that even if the probe 109b is made to approach the object 325 at a close distance, the coaxial cable 108 and the substrate 101a would not make contact with the object 325.

In accordance with the coaxial probe 110, it would be possible to make the probe 109a approach a surface of the object 325 at a distance which is a general level in an interatomic-force microscope, and measure an electric capacity along irregularities of a surface of the object 325.

Figure 3A:
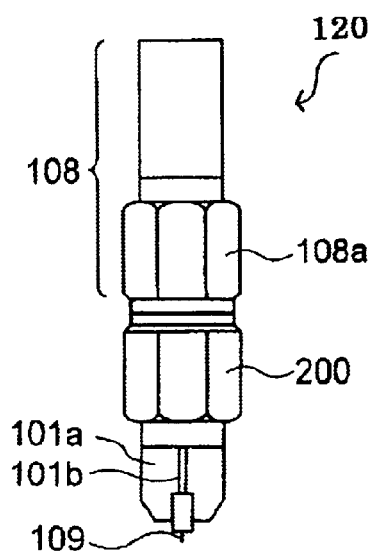
FIG. 3A is a cross-sectional view of a coaxial probe in accordance with the second embodiment.
Figure 3B:
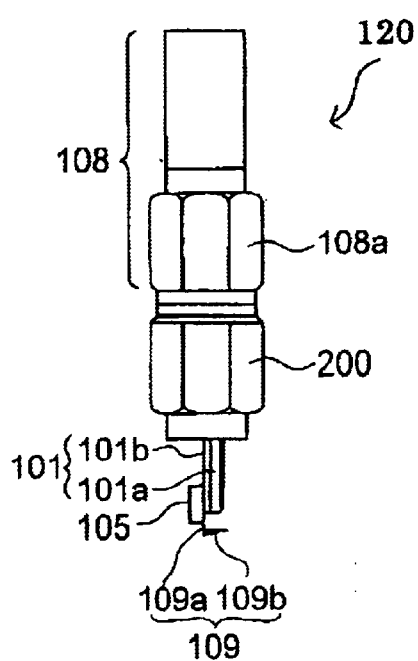
FIG. 3B is a side view of a coaxial probe in accordance with the second embodiment.

FIG. 3A is a cross-sectional view of the coaxial probe 120 in accordance with the second embodiment, and FIG. 3B is a side view of the coaxial probe 120.

The coaxial probe 120 is comprised of a coaxial cable 108 including a first electrical conductor (not illustrated) extending therethrough, a first connector 108a non-separatable from the coaxial cable 108, a second connector 200 detachably coupled to the first connector 108a and including a second electrical conductor (not illustrated) extending therethrough and projecting therefrom at an end thereof, a planar waveguide 101 on which the second electrical conductor projecting from the second connector 200 is mounted, and a sensor 109 electrically connected to the second electrical conductor through the planar waveguide 101.

The second electrical conductor is electrically connected to the first electrical conductor when the first and second connectors 108a and 200 are coupled to each other, The planar waveguide 101 is comprised of a substrate 101a having a size of 4 mm×4 mm, and a strip line 101b formed on the substrate 101a.

The sensor 109 is comprised of a cantilever 109a supported at a distal end thereof on the planar waveguide 101, and a probe 109b mounted on a free end of the cantilever 109a.

The sensor 109 is excited at a frequency close to a resonance frequency of a movement of the cantilever 109a.

The probe 109b having a sharpened tip end is incorporated into the second electrical conductor.

The strip line 101b is electrically connected at one end to the cantilever 109a through In alloy and at the other end to the second electrical conductor.

A support 105 having a size of 1 mm×2 mm and a thickness of 0.5 mm fixes the cantilever 109a at the distal end of the cantilever 109a onto the planar waveguide 101.

The support 105 and the cantilever 109a are located on an extension of the electrical conductor 107 and are inclined relative to an axis of the electrical conductor 107. This arrangement ensures that even if the probe 109b is made to approach the object 325 at a close distance, the coaxial cable 108 and the substrate 101a would not make contact with the object 325.

In accordance with the coaxial probe 110, it would be possible to make the probe 109a approach a surface of the object 325 at a distance which is a general level in an interatomic-force microscope, and measure an electric capacity along irregularities of a surface of the object 325.

In addition, since it would be possible to exchange the sensor 109 and the planar waveguide 101 into others by exchanging the second connector 200 into another one.

Figure 4A:
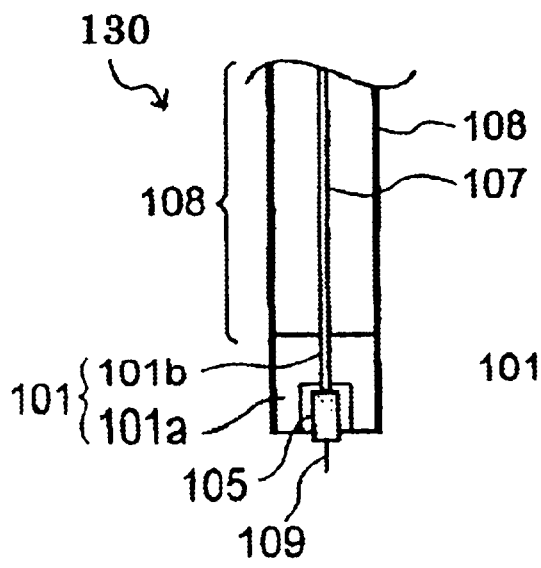
FIG. 4A is a cross-sectional view of a coaxial probe in accordance with the third embodiment.
Figure 4B:
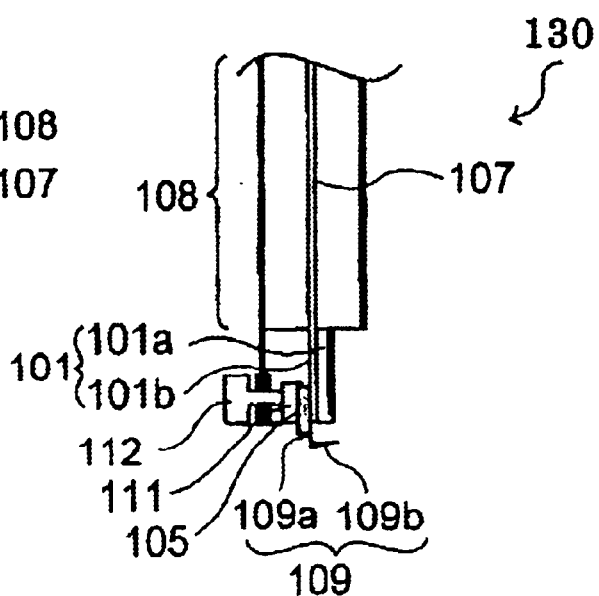
FIG. 4B is a side view of a coaxial probe in accordance with the third embodiment.

FIG. 4A is a cross-sectional view of the coaxial probe 130 in accordance with the third embodiment, and FIG. 4B is a side view of the coaxial probe 130.

Whereas the sensor 109 is integral with the planar waveguide 101 in the coaxial probe 110 in accordance with the first embodiment, the sensor 109 is designed detachable from the planar waveguide 101 in the coaxial probe 130 in accordance with the third embodiment.

The coaxial probe 130 is comprised of a coaxial cable 108 including an electrical conductor 107 extending therethrough and projecting therefrom at an end thereof, a planar waveguide 101 on which the electrical conductor 107 projecting from the coaxial cable 108 is mounted, a sensor 109 electrically connected to the electrical conductor 107 through the planar waveguide 101, a support 105 which fixes the sensor 109 onto the planar waveguide 101, an electrically insulating sensor holder 111 making contact with the support 105, and a screw 112 for compressing the sensor holder 111 onto the support 105.

The planar waveguide 101 is comprised of a substrate 101a having a size of 4 mm×4 mm, and a strip line 101b formed on the substrate 101a.

The sensor 109 is comprised of a cantilever 109a supported at a distal end thereof on the planar waveguide 101, and a probe 109b mounted on a free end of the cantilever 109a.

The sensor 109 is excited at a frequency close to a resonance frequency of a movement of the cantilever 109a.

The probe 109b having a sharpened tip end is incorporated into the electrical conductor 107.

The strip line 101b is electrically connected at one end to the cantilever 109a through In alloy and at the other end to the electrical conductor 107.

The support 105 fixes the cantilever 109a at the distal end of the cantilever 109a onto the planar waveguide 101.

The support 105 and the cantilever 109a are located on an extension of the electrical conductor 107 and are inclined relative to an axis of the electrical conductor 107. This arrangement ensures that even if the probe 109b is made to approach the object 325 at a close distance, the coaxial cable 108 and the substrate 101a would not make contact with the object 325.

In accordance with the coaxial probe 110, it would be possible to make the probe 109a approach a surface of the object 325 at a distance which is a general level in an interatomic-force microscope, and measure an electric capacity along irregularities of a surface of the object 325.

In addition, since it would be possible to exchange the sensor 109 into another one by exchanging the coaxial probe 130 into another one.

Figure 5A:
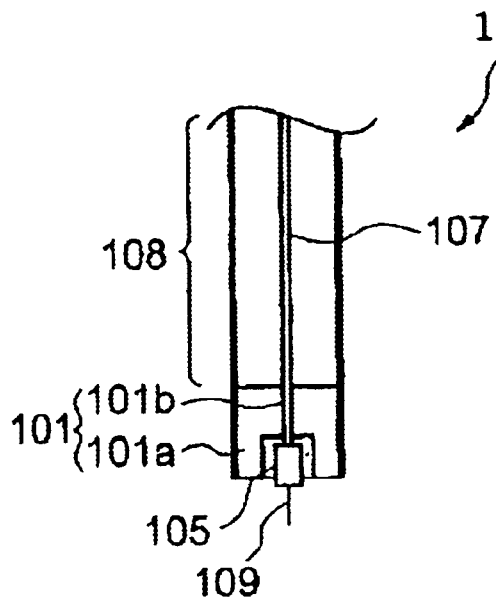
FIG. 5A is a cross-sectional view of a coaxial probe in accordance with the fourth embodiment.
Figure 5B:
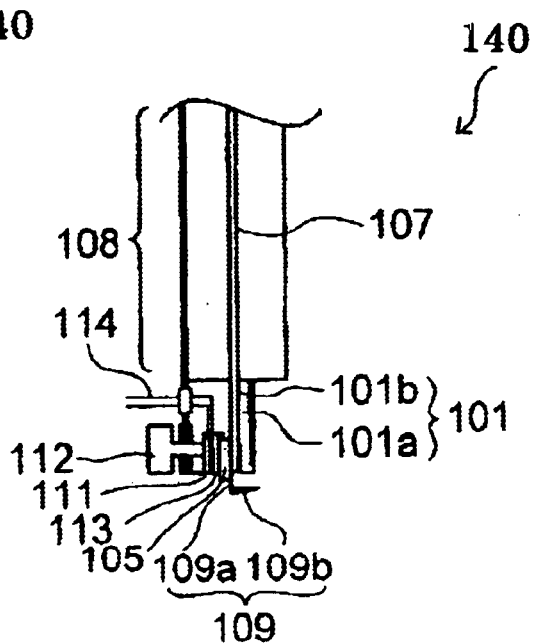
FIG. 5B is a side view of a coaxial probe in accordance with the fourth embodiment.

FIG. 5A is a cross-sectional view of the coaxial probe 140 in accordance with the fourth embodiment, and FIG. 5B is a side view of the coaxial probe 140.

The coaxial probe 140 has the same structure as the structure of the coaxial probe 130 in accordance with the third embodiment, and additionally includes a piezoelectric device 113 incorporated into the sensor holder 111, and an electrode terminal 114 extending from the piezoelectric device 113 outwardly of the coaxial cable 108.

The piezoelectric device 113 is formed integrally in the sensor holder 111 with electrodes being sandwiched between the piezoelectric device 113 and the sensor holder 111. The electrodes are grounded. The screw 112 compresses the sensor holder 111 and the piezoelectric device 113 onto the support 105, and electrically connects the cantilever 109a to the strip line 101b.

In accordance with the coaxial probe 140, the coaxial probe 140 can be taken out by releasing the screw 112. In addition, application of an ac voltage having a frequency close to a resonance frequency of the coaxial probe 140 to the electrode terminal 114 would cause a bending displacement in the probe 109b which is resonant to the coaxial probe 140, ensuring the probe 109b makes periodical contact with a surface of the object 325.

Figure 6A:
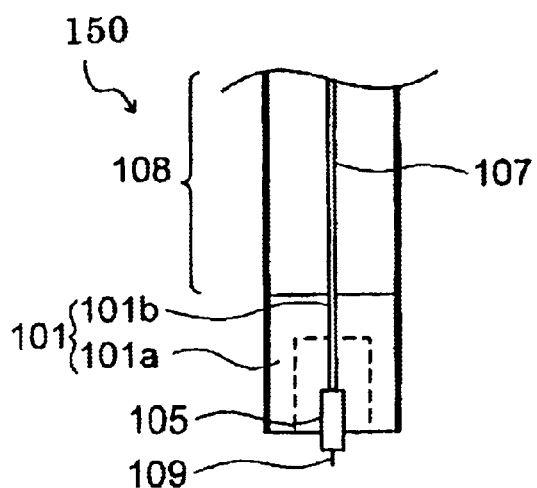
FIG. 6A is a cross-sectional view of a coaxial probe in accordance with the fifth embodiment.
Figure 6B:
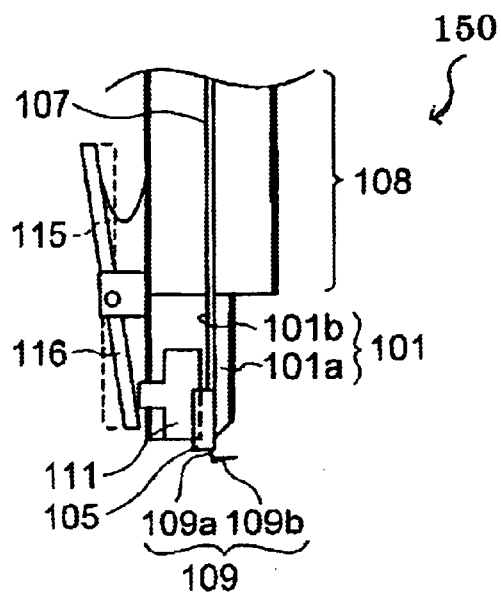
FIG. 6B is a side view of a coaxial probe in accordance with the fifth embodiment.

FIG. 6A is a cross-sectional view of the coaxial probe 150 in accordance with the fifth embodiment, and FIG. 6B is a side view of the coaxial probe 150.

The coaxial probe 150 is comprised of a coaxial cable 108 including an electrical conductor 107 extending therethrough and projecting therefrom at an end thereof, a planar waveguide 101 on which the electrical conductor 107 projecting from the coaxial cable 108 is mounted, a sensor 109 electrically connected to the electrical conductor 107 through the planar waveguide 101, a support 105 which fixes the sensor 109 onto the planar waveguide 101, an electrically insulating sensor holder 111 making contact with the support 105, a lever 116 supported at a center thereof such that the lever 116 can swing about the center thereof, and a leaf spring 115 applying a force to the lever 116 such that the lever 116 compresses the sensor holder 111.

The planar waveguide 101 is comprised of a substrate 101a having a size of 4 mm×4 mm, and a strip line 101b formed on the substrate 101a.

The sensor 109 is comprised of a cantilever 109a supported at a distal end thereof on the planar waveguide 101, and a probe 109b mounted on a free end of the cantilever 109a.

The sensor 109 is excited at a frequency close to a resonance frequency of a movement of the cantilever 109a.

The probe 109b having a sharpened tip end is incorporated into the electrical conductor 107.

The sensor 109 is compressed by the leaf spring 115 through the lever 116 and the sensor holder 111 to thereby be electrically connected to the strip line 101b.

By incorporating the piezoelectric device 113 into the sensor holder 111 in the same manner as the fourth embodiment, resonant bending oscillation could be caused to the probe 109b.

In accordance with the fifth embodiment, the coaxial probe 150 can be released by rotating the lever 116 about the center against a resilient force exerted by the leaf spring 115.

Figure 7A:
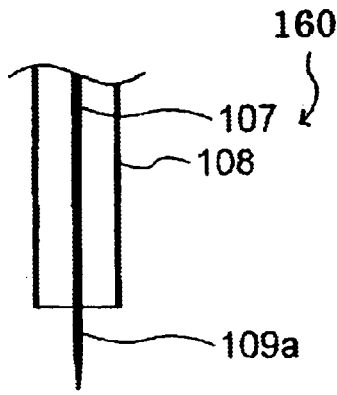
FIG. 7A is a cross-sectional view of a coaxial probe in accordance with the sixth embodiment.
Figure 7B:
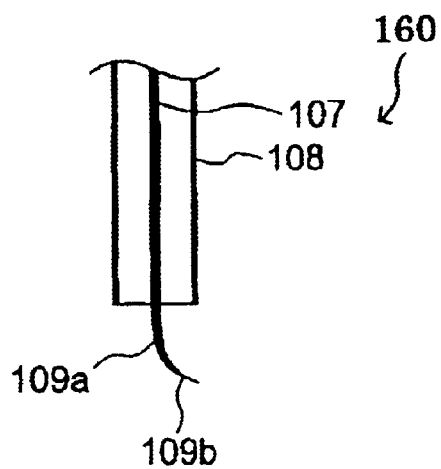
FIG. 7B is a side view of a coaxial probe in accordance with the sixth embodiment.

FIG. 7A is a cross-sectional view of the coaxial probe 160 in accordance with the sixth embodiment, and FIG. 7B is a side view of the coaxial probe 160.

The coaxial probe 160 includes a coaxial cable 108 having an electrical conductor 107 extending therethrough and projecting therefrom at an end thereof.

The electrical conductor 107 includes a bending portion and a sharpened tip end. The bending portion defines a cantilever 109a and the sharpened tip end defining a probe 109b.

The coaxial probe 160 can provide the same advantages as the advantages presented by the coaxial probe 110 in accordance with the first embodiment, even though the coaxial probe 160 has a simpler structure than the structure of the coaxial probe 110.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-119516 filed on Apr. 20, 2000 including specification, claims, drawings and summary is incorporated herein by reference in its entirety.

What is claimed is:

1. A coaxial probe comprising:
   (a) a coaxial cable including an electrical conductor extending therethrough and projecting therefrom at an end thereof;
   (b) a planar waveguide on which said electrical conductor projecting from said coaxial cable is mounted;
   (c) a sensor comprised of a cantilever supported at a distal end thereof on said planar waveguide and a probe mounted on a free end of said cantilever, said sensor electrically connected to said electrical conductor through said planar waveguide; and
   (d) a support which fixes said cantilever at said distal end of said cantilever onto said planar waveguide;
      wherein said support and said cantilever are located on an extension of said electrical conductor and are inclined relative to an axis of said electrical conductor.

2. The coaxial probe as set forth in claim 1, wherein said planar waveguide is comprised of:
   (b1) a substrate; and
   (b2) a strip line formed on said substrate, said strip line being electrically connected at one end to said sensor and at the other end to said electrical conductor.

3. The coaxial probe as set forth in claim 1, wherein said planar waveguide is comprised of:
   (b1) a substrate; and
   (b2) a coplanar line formed on said substrate, said coplanar line being electrically connected at one end to said sensor and at the other end to said electrical conductor.

4. The coaxial probe as set forth in claim 1, wherein said sensor is excited at a frequency close to a resonance frequency of a movement of said cantilever.

5. The coaxial probe as set forth in claim 1, wherein said sensor is detachable from said coaxial cable.

6. The coaxial probe as set forth in claim 1, wherein said support is detachable from said coaxial cable.

7. A coaxial probe comprising:
   (a) a coaxial cable including an electrical conductor extending therethrough and projecting therefrom at an end thereof;
   (b) a planar waveguide on which said electrical conductor projecting from said coaxial cable is mounted;
   (c) a sensor comprised of a cantilever supported at a distal end thereof on said planar waveguide and a probe mounted on a free end of said cantilever, said sensor electrically connected to said electrical conductor through said planar waveguide;
   (d) an electrically insulating sensor holder making contact with said sensor;
   (e) means for compressing said sensor holder onto said sensor; and
   (f) a support which fixes said cantilever at said distal end of said cantilever onto said planar waveguide, said sensor holder making contact with said support and said means for compressing said sensor holder onto said support;
      wherein said support and said cantilever are located on an extension of said electrical conductor and are inclined relative to an axis of said electrical conductor.

8. The coaxial probe as set forth in claim 7, wherein said planar waveguide is comprised of:
   (b1) a substrate; and
   (b2) a strip line formed on said substrate, said strip line being electrically connected at one end to said sensor and at the other end to said electrical conductor.

9. The coaxial probe as set forth in claim 7, wherein said planar waveguide is comprised of:
   (b1) a substrate; and
   (b2) a coplanar line formed on said substrate, said coplanar line being electrically connected at one end to said sensor and at the other end to said electrical conductor.

10. The coaxial probe as set forth in claim 7, wherein said sensor is excited at a frequency close to a resonance frequency of a movement of said cantilever.

11. The coaxial probe as set forth in claim 7, wherein said means for compressing is comprised of a screw.

12. The coaxial probe as set forth in claim 7, wherein said means for compressing is comprised of a lever supported for rotation, and an actuator which actuates said lever such that the lever compresses said sensor holder onto said sensor.

13. A coaxial probe comprising:
   (a) a coaxial cable including an electrical conductor extending therethrough and projecting therefrom at an end thereof;
   (b) a planar waveguide on which said electrical conductor projecting from said coaxial cable is mounted;
   (c) a sensor electrically connected to said electrical conductor through said planar waveguide;
   (d) a sensor holder making contact with said sensor;
   (e) means for compressing said sensor holder onto said sensor;
   (f) a piezoelectric device incorporated in said sensor holder; and
   (g) an electrode terminal extending from said piezoelectric device outwardly of said coaxial cable.

14. A scanning micro-wave microscope comprising:
   (a) a coaxial probe;
   (b) a controller; and
   (c) a support,
   said coaxial probe including:

(a1) a coaxial cable including an electrical conductor extending therethrough and projecting therefrom at an end thereof;

(a2) a planar waveguide on which said electrical conductor projecting from said coaxial cable is mounted, said planar waveguide comprised of a substrate and a coplanar line formed on said substrate; and (a3) a sensor electrically connected to said electrical conductor through said planar waveguide, said sensor including a cantilever supported at a distal end thereof on said planar waveguide, and a probe mounted on a free end of said cantilever, said controller controlling a distance between said probe and an object, based on a detection signal indicative of displacement of a free end of said cantilever, and scanning a surface of said object with said probe to thereby form an image of said surface of said object;

said coplanar line being electrically connected at one end to said sensor and at the other end to said electrical conductor;

said support fixes said cantilever at said distal end of said cantilever onto said planar waveguide;

wherein said support and said cantilever are located on an extension of said electrical conductor and are inclined relative to an axis of said electrical conductor.

15. The scanning micro-wave microscope as set forth in claim 14, wherein said planar waveguide further comprises:

a strip line formed on said substrate, said strip line being electrically connected at one end to said sensor and at the other end to said electrical conductor.

16. The scanning micro-wave microscope as set forth in claim 14, wherein said sensor is excited at a frequency close to a resonance frequency of a movement of said cantilever.

17. A scanning micro-wave microscope comprising:

(a) a coaxial probe; and (b) a controller, said coaxial probe including:

(a1) a coaxial cable including an electrical conductor extending therethrough and projecting therefrom at an end thereof;

(a2) a planar waveguide on which said electrical conductor projecting from said coaxial cable is mounted;

(a3) a sensor electrically connected to said electrical conductor through said planar waveguide;

(a4) an electrically insulating sensor holder making contact with said sensor; and (a5) means for compressing said sensor holder onto said sensor, said sensor including a cantilever supported at a distal end thereof on said planar waveguide, and a probe mounted on a free end of said cantilever, said controller controlling a distance between said probe and an object, based on a detection signal indicative of displacement of a free end of said cantilever, and scanning a surface of said object with said probe to thereby form an image of said surface of said object.

18. The scanning micro-wave microscope as set forth in claim 17, wherein said planar waveguide is comprised of:

(b1) a substrate; and (b2) a strip line formed on said substrate, said strip line being electrically connected at one end to said sensor and at the other end to said electrical conductor.

19. The scanning micro-wave microscope as set forth in claim 17, wherein said planar waveguide is comprised of:

(b1) a substrate; and (b2) a coplanar line formed on said substrate, said coplanar line being electrically connected at one end to said sensor and at the other end to said electrical conductor.

20. The scanning micro-wave microscope as set forth in claim 17, wherein said coaxial cable further includes a support which fixes said cantilever at said distal end of said cantilever onto said planar waveguide, said sensor holder making contact with said support and said means compressing said sensor holder onto said support.

21. The scanning micro-wave microscope as set forth in claim 20, wherein said support and said cantilever are located on an extension of said electrical conductor and are inclined relative to an axis of said electrical conductor.

22. The scanning micro-wave microscope as set forth in claim 17, wherein said sensor is excited at a frequency close to a resonance frequency of a movement of said cantilever.

23. The scanning micro-wave microscope as set forth in claim 17, wherein said means for compressing is comprised of a screw.

24. The scanning micro-wave microscope as set forth in claim 17, wherein said means for compressing is comprised of a lever supported for rotation, said lever swinging downwardly to thereby compress said sensor holder.

25. A scanning micro-wave microscope comprising:

(a) a coaxial probe; and (b) a controller, said coaxial probe including:

(a1) a coaxial cable including an electrical conductor extending therethrough and projecting therefrom at an end thereof;

(a2) a planar waveguide on which said electrical conductor projecting from said coaxial cable is mounted;

(a3) a sensor electrically connected to said electrical conductor through said planar waveguide;

(a4) a sensor holder making contact with said sensor;

(a5) means for compressing said sensor holder onto said sensor;

(a6) a piezoelectric device incorporated in said sensor holder; and (a7) an electrode terminal extending from said piezoelectric device outwardly of said coaxial cable, said sensor including a cantilever supported at a distal end thereof on said planar waveguide, and a probe mounted on a free end of said cantilever, said controller controlling a distance between said probe and an object, based on a detection signal indicative of displacement of a free end of said cantilever, and scanning a surface of said object with said probe to thereby form an image of said surface of said object.

* * * * *